US00RE38967E

(19) United States
(12) Reissued Patent
Kreuzer et al.

(10) Patent Number: US RE38,967 E
(45) Date of Reissued Patent: Feb. 7, 2006

(54) VIDEO MONITOR AND HOUSING ASSEMBLY

(75) Inventors: Monroe E. Kreuzer, Anahuac, TX (US); John E. Fox, Anahuac, TX (US)

(73) Assignee: K & F Manufacturing, Ltd., Anahuac, TX (US)

(21) Appl. No.: 08/511,015

(22) Filed: Nov. 7, 1995

Related U.S. Patent Documents

Reissue of:
(64) Patent No.: 5,282,182
Issued: Jan. 25, 1994
Appl. No.: 07/789,883
Filed: Nov. 12, 1991

(51) Int. Cl.
*G11B 31/00* (2006.01)

(52) U.S. Cl. ..... 369/21; 348/148; 396/427
(58) Field of Classification Search ..... 369/21, 369/12, 39; 348/148, 158, 207.99, 143, 335, 348/375, 372, 151, 373; 395/200.47; 206/335, 206/486; 224/908, 315; 396/535, 301, 544, 396/155, 71, 427, 419
See application file for complete search history.

(56) References Cited

U.S. PATENT DOCUMENTS

| | | | | |
|---|---|---|---|---|
| 1,451,382 A | | 4/1923 | Wescott | |
| 1,701,800 A | | 2/1929 | Taylor | |
| 1,733,783 A | * | 10/1929 | Medina | 354/81 |
| 2,148,119 A | | 2/1939 | Grist | 95/1.1 |
| 2,464,067 A | | 3/1949 | Barker | 95/11 |
| 2,582,779 A | | 1/1952 | Hoge | 248/183 |
| 2,928,084 A | | 3/1960 | Ashby | 343/10 |
| 3,053,932 A | | 9/1962 | Worst | 178/6 |
| 3,148,932 A | | 9/1964 | Simjian | 346/22 |
| 3,164,838 A | | 1/1965 | Heinrich | 352/69 |
| 3,176,602 A | | 4/1965 | Wilt | 95/86 |
| 3,290,597 A | | 12/1966 | Denny et al. | 325/64 |
| 3,349,679 A | | 10/1967 | Lohman, III | 95/11 |
| 3,352,966 A | | 11/1967 | Sawazaki et al. | 178/6 |
| 3,399,614 A | | 9/1968 | Fischer | 95/86 |
| 3,421,721 A | | 1/1969 | Miller | 244/129 |
| 3,461,429 A | | 8/1969 | Gray | 340/172.5 |
| 3,482,037 A | | 12/1969 | Brown et al. | 178/6 |
| 3,484,549 A | | 12/1969 | Ricketts et al. | 178/6 |
| 3,515,472 A | | 6/1970 | Schwitzgebel | 352/132 |
| 3,535,442 A | | 10/1970 | Jennings | 178/6.8 |
| 3,568,583 A | | 3/1971 | Horberg, Jr. et al. | 95/15 |
| 3,580,993 A | | 5/1971 | Sandorf et al. | 178/6 |
| 3,603,545 A | | 9/1971 | Boniface | 248/184 |

(Continued)

OTHER PUBLICATIONS

"Texas district happy with results of using video camera on buses", Newspaper article appearing in the Arkansas Democrat–Gazette on Feb. 21, 1992.

(Continued)

*Primary Examiner*—Ali Neyzari
(74) *Attorney, Agent, or Firm*—Bracewell & Patterson, LLP

(57) ABSTRACT

A portable video cassette camera or minicam, preferably a palmcorder, is placed within a vehicle so as to monitor the activity within the passenger compartment. The minicam is contained in a box fastened to a wall within the vehicle so as to prevent the theft of the minicam. The minicam is mounted on a base adapted to fit snugly inside the box, the door of the box is opened, the base and minicam are placed inside the box once the minicam is set to record, and the door is closed. The minicam records the activity occurring in the passenger compartment through a solar cool glass window located in the door of the box.

34 Claims, 2 Drawing Sheets

U.S. PATENT DOCUMENTS

| | | | | | |
|---|---|---|---|---|---|
| 3,634,008 | A | | 1/1972 | Plummer et al. | 355/56 |
| 3,668,308 | A | | 6/1972 | Burt et al. | 178/6.6 |
| 3,686,434 | A | | 8/1972 | Lemelson | 178/6.6 |
| 3,689,695 | A | | 9/1972 | Rosenfield et al. | 178/7.81 |
| 3,720,147 | A | | 3/1973 | Bemis | 95/86 |
| 3,732,368 | A | | 5/1973 | Mahlab | 178/7.81 |
| 3,739,702 | A | | 6/1973 | Wender et al. | 95/14 |
| 3,739,703 | A | | 6/1973 | Behles | 95/15 |
| 3,752,047 | A | * | 8/1973 | Gordon et al. | 354/81 X |
| 3,757,039 | A | | 9/1973 | Brewer | 178/6.8 |
| 3,798,796 | A | | 3/1974 | Stauff et al. | 35/25 |
| 3,812,287 | A | | 5/1974 | Lemelson | 178/6.8 |
| 3,819,856 | A | | 6/1974 | Peral et al. | 178/7.81 |
| 3,863,245 | A | | 1/1975 | Swinamer et al. | 340/286 |
| 3,868,478 | A | | 2/1975 | Zeenkov | 178/6.8 |
| 3,885,090 | A | | 5/1975 | Rosenbaum | 178/6.6 |
| 3,935,380 | A | | 1/1976 | Coutta | 178/6.8 |
| 3,962,532 | A | | 6/1976 | Aubert et al. | 178/5.6 |
| 3,993,866 | A | * | 11/1976 | Pearl et al. | 354/81 X |
| 4,001,881 | A | | 1/1977 | Folsom | 360/5 |
| 4,009,419 | A | | 2/1977 | Ligman | 361/91 |
| 4,015,366 | A | | 4/1977 | Hall, III | 47/1 |
| 4,058,993 | A | | 11/1977 | Stubbings | 70/58 |
| 4,063,258 | A | | 12/1977 | Allen | 354/81 |
| 4,067,015 | A | | 1/1978 | Mogavero et al. | 343/225 |
| 4,072,031 | A | | 2/1978 | Kent | 70/58 |
| 4,080,629 | A | | 3/1978 | Hammond et al. | 358/229 |
| 4,084,359 | A | | 4/1978 | Snell | 52/40 |
| 4,093,364 | A | | 6/1978 | Miller | 352/132 |
| 4,107,459 | A | | 8/1978 | Stamper | 178/69.1 |
| 4,107,611 | A | | 8/1978 | Holcomb et al. | 325/55 |
| 4,112,818 | A | | 9/1978 | Garehime, Jr. | 89/41 |
| 4,120,004 | A | | 10/1978 | Coutta | 358/108 |
| 4,160,999 | A | * | 7/1979 | Claggett | 354/81 X |
| 4,161,352 | A | | 7/1979 | Felix et al. | 350/301 |
| 4,214,265 | A | | 7/1980 | Olesen | 358/93 |
| 4,225,881 | A | | 9/1980 | Tovi | 358/108 |
| 4,233,634 | A | | 11/1980 | Adams | 358/229 |
| 4,245,902 | A | | 1/1981 | Cataldo et al. | 354/76 |
| 4,249,206 | A | | 2/1981 | Roscoe | 358/86 |
| 4,277,804 | A | | 7/1981 | Robison | 358/108 |
| 4,281,354 | A | | 7/1981 | Conte | 360/5 |
| 4,283,743 | A | | 8/1981 | Kaiser | 358/248 |
| 4,288,814 | A | | 9/1981 | Talley et al. | 358/93 |
| D262,117 | S | | 12/1981 | Sasaki | |
| 4,320,949 | A | | 3/1982 | Pagano | 354/81 |
| 4,326,218 | A | | 4/1982 | Coutta et al. | 358/108 |
| 4,337,482 | A | | 6/1982 | Coutta | 358/108 |
| 4,394,692 | A | | 7/1983 | Randmae et al. | 358/229 |
| 4,396,942 | A | | 8/1983 | Gates | 358/107 |
| 4,414,576 | A | | 11/1983 | Randmae | 358/229 |
| 4,420,238 | A | | 12/1983 | Felix | 354/81 |
| 4,474,439 | A | | 10/1984 | Brown | 352/243 |
| 4,483,011 | A | | 11/1984 | Brown | 375/25 |
| 4,510,526 | A | | 4/1985 | Coutta et al. | 358/108 |
| 4,511,886 | A | | 4/1985 | Rodriguez | 340/534 |
| 4,533,962 | A | | 8/1985 | Decker et al. | 360/5 |
| 4,534,632 | A | * | 8/1985 | Laviolette | 354/81 |
| 4,535,826 | A | | 8/1985 | Bell | 141/231 |
| 4,540,977 | A | | 9/1985 | Taillens et al. | 340/552 |
| 4,563,673 | A | | 1/1986 | Fechner | 340/568 |
| 4,568,972 | A | | 2/1986 | Arents | 358/108 |
| 4,578,665 | A | | 3/1986 | Yang | 340/48 |
| 4,618,886 | A | | 10/1986 | Mooney | 358/108 |
| 4,630,110 | A | | 12/1986 | Cotton et al. | 358/108 |
| 4,651,144 | A | | 3/1987 | Pagano | 340/693 |
| 4,665,430 | A | | 5/1987 | Hiroyasu | 358/108 |
| 4,672,435 | A | | 6/1987 | Gliick | 358/89 |
| 4,709,265 | A | | 11/1987 | Silverman et al. | 358/108 |
| 4,709,897 | A | | 12/1987 | Mooney | 248/551 |
| 4,713,685 | A | | 12/1987 | Nishimura et al. | 358/103 |
| 4,728,839 | A | | 3/1988 | Coughlan et al. | 310/112 |
| 4,734,725 | A | | 3/1988 | Bierman | 354/76 |
| 4,736,218 | A | | 4/1988 | Kutman | 354/81 |
| 4,740,839 | A | | 4/1988 | Phillips | 358/108 |
| 4,789,904 | A | * | 12/1988 | Peterson | 360/5 X |
| 4,816,828 | A | | 3/1989 | Feher | 340/945 |
| 4,831,438 | A | | 5/1989 | Bellman, Jr. et al. | 358/108 |
| 4,833,534 | A | | 5/1989 | Paff et al. | 358/108 |
| 4,843,463 | A | * | 6/1989 | Michetti | 360/5 X |
| 4,847,772 | A | | 7/1989 | Michalopoulos et al. | 364/436 |
| 4,857,912 | A | | 8/1989 | Everett, Jr. et al. | 340/825 |
| 4,863,130 | A | | 9/1989 | Marks, Jr. | 248/206.3 |
| 4,866,422 | A | | 9/1989 | Dunnett et al. | 340/539 |
| 4,866,438 | A | | 9/1989 | Knisch | 340/936 |
| 4,881,135 | A | * | 11/1989 | Heilweil | 358/108 X |
| 4,893,326 | A | | 1/1990 | Duran et al. | 379/53 |
| 4,910,591 | A | | 3/1990 | Petrossian et al. | 358/103 |
| 4,949,186 | A | | 8/1990 | Peterson | 358/335 |
| 4,978,984 | A | | 12/1990 | Brookfield | 354/81 |
| 4,984,089 | A | | 1/1991 | Stiepel et al. | 358/229 |
| 5,012,335 | A | * | 4/1991 | Cohodar | 354/81 X |
| 5,032,820 | A | | 7/1991 | Tanikawa et al. | 340/310 |
| 5,111,289 | A | | 5/1992 | Lucas et al. | 358/108 |
| 5,204,742 | A | | 4/1993 | Nordmann | 358/108 |
| 5,319,394 | A | * | 6/1994 | Dukek | 348/148 |

OTHER PUBLICATIONS

Horswell, Cindy, "Turning little devils into little angels", *Houston Chronicle*, Apr. 8, 1991, section A, p. 9.

"They're On Candid Camera", *American Education,* Mar. 1978, p. 4.

Alistair, Baker, "Gotcha!" What the Camera Spies With its Little Eye . . . , (London) Sunday Times, Mar. 8, 1987.

Advertisement for Billingsley Parts & Equipment, Inc, "Visual/Audio Monitoring System", in *School Bus Fleet,* Aug./Sep. 1990, p. 74.

Daniel P. Brown, "A Video Surveillance System for Public Transportion Vehicles Using 2–Way Land–Mobile Radio", *IEEE Transactions on Consumer Electronics,* vol. CE–26, No. 3, Aug. 1980, pp/ 247–250.

"Integra: The Safe Route for P.S.V.'s", Brochure from Cyberlyne Communications Ltd. (CCL), 1988.

"Vandalism and Violence: Counting the Cost", *City Transport I,* Sep./Nov. 1986, p. 31.

Inset, "Electronic Eye," *School Bus Fleet,* Feb. 1995, p. A10.

Paul J. Goldsack, "Video Cameras Cut U.K. Bus Assult Statistics", *Mass Transit*, Jun. 1987, pp 13–14.

"Smile, You're On . . . ", *School Bus Fleet,* Aug./Sep. 1973, pp. 22–26.

Advertisement for Sony School Bus Electronics, in *School Bus Fleet,* Dec. 1989/Jan. 1990, p. 55.

Gary Washburn, "CTA Cameras Rolling to Help Fight Crime", *Chicago Tribune,* Section 2, Tuesday, Mar. 27, 1990, p. 4.

Dennis Stokoe, "Cooper Has £lm Deal for NY Bus Security", *The Journal,* Jun. 29, 1988.

Advertisement for "Cyberlyne PSV Surveillance Systems", in *City Transport,* Sep./Nov. 1986, p. 30.

Neil McKay, "Camera Firm Fights Bus Snatch Gangs", *Sunday Sun,* Feb. 21, 1989.

Press Release from the Association of Public Transportation Austhorities (APTA), "First PSV Video Surveillance System Arrives in USA", Apr., 1988.

Press Release issued by Citybus Limited, Belfast, "Embargo: 25$^{th}$ Feb. 1988—1030".

Jon Myles, "Video Frame Puts Vandals on Hold", *Coventry Evening Telegraph,* Jan. 27, 1988, p. 1.
Ian Hahn, Press Release issued by Blackburn Borough Transport Limited, dated May 15, 1987.
"Growing Fast in the CCTV Industry" and "Tailor–Made Systems by CCL Experts", from *Business North East,* Dec. 1990, pp. 34–37.
Excerpt from article in *Police Review,* Jun. 26, 1987, p. 1277.
Trevor Reynolds, "Batting Pat Routs the Video Nastics", *Daily Mirror,* Jun. 30, 1987, p. 11.
Collection of newspaper and magazine clippings regarding on–board video surveillance.
"Watch It! You're on Trooper TV", by E.D. Fales, Jr., *Popular Mechanics,* p. 85 (Oct., 1968).
"Videotaping the DWI Suspect", by Duane R. Kinsey, *The Police Chief,* p. 18 (Oct. 1977).
"Video Recorders in Fighters Evaluated", by Bruce A. Smith, *Aviation Week & Space Technology,* p. 59 (Mar. 20, 1978).
"TWA Develops Crew Safety Program" (Los Angeles), *Aviation Week & Space Technology,* p. 36 (Sep. 17, 1979).
"A Guide to Equipment and Technique", by Joe Rusz, (source not known), p. 173 (May, 1981).
"Inside Story Video", by Gareth Renowden, Gloucester Press (1983).
"Computer Improves Police Effectiveness, Saves Time and Money" and "Police Batmobile With Sony Video System Enhances Field Tests Conviction Rates of Drunk Driving Suspects", *Enforcement Journal,* p. 2 (1982).
"Video/Movie Methods—News from CES: Solid–state Cameras, Miniature–Format VHS Portables; 35 mm SLR Makers Enter Video Market" by Leendert Drukker, *Popular Photography,* p. 24 (Sep. 1982).
"Batmobile With Video System Aids Convictions Rates of DWI Suspects", *Law and Order,* p. 37 (Nov. 1982).
"The Drunk Driver, Video Tape, and More Convictions", by Joseph Missonellie, *Law and Order,* p. 32 (Nov. 1982).
"Police Get Aid From Video 'Witness' in Squad Car", by Bill McAwiffe, *Minneapolis Star–Tribune,* Minneapolis, Minn. (Jun. 22, 1983).
*Videography,* p. 72 (Jul. 1983).
"Video Recording Equipment for Law Enforcement Use", by Robert E. Mayer, *Law and Order,* p. 32 (Aug. 1983).
Hardware Report Section, *Videography,* p. 75 (Nov. 1983).
"D[r]essing for Sucess in Video", by Jill Ottenberg, *Videography,* p. 66 (Dec. 1983).
"Video on Patrol", *Law and Order,* p. 29 (Feb. 1984).
"The Trials of Videotaped Evidence", by Norman Spain, J.D., CPP, *Security World,* p. 38 (Jul. 1984).
"Auto Video Take II"by Joe Rusz, *Road & Track,* p. 194 (May 1985).
"Underwater Video", *Popular Mechanics,* p. 114 (Aug. 1985).
"Extra Eyes" ("Officer has video lens at his witness"), by Anne Burris, *The Daily Herald,* Chicago, Ill. (Feb. 26, 1986).
"This is Not 'Candid Camera', This Is For Real", (re Cook County Police) by Pete Reynolds, *The Star,* Chicago, Ill. (Mar. 6, 1986).
"Videos Become Aid to Police", (article source not known—Chicago (AP), Decatur, Ill, p. A11 (Mar. 20, 1986).
"County Cops Test Car Video System", by Daryl Strickland, *Chicago Tribune,* Chicago, Ill. (Mar. 19, 1986).
"Brazoria County Man Designs TV Camera for Police Cruisers", by Rob Meckel, *The Houston Post,* Houston, Texas (Apr. 27, 1986).
"Cook County Eyes Video As Officer Safeguard", *Law Enforcement News,* p. 3 (Apr. 21, 1986).
"The Camera Doesn't Lie", (re Cook County, Ill/Roger Peterson) Editorial/Opinion Section, *The Houston Post,* Houston, Texas (May 1, 1986).
"Creator of Gizmos", (re Roger Peterson), by Diana Brannum, *The Daily Tribune,* Bay City, Texas (Jun. 29, 1986).
"Use of a Video Camera for DUI Investigations", by Sgt. Lloyd Kilpack, *FBI Law Enforcement Bulletin,* p. 7 (May, 1987).
"Lights, Camera, Action!—In Car Video Systems for Law Enforcement", by James Geibel, *Police and Security News,* p. 5 (Mar.–Apr. 1991).
"Safe–Stops—New Mobile Surveillance System Assists Patrol Officers", by David L. Coles, *Police* (Sep. 1988).
"Eyewitness . . . Designed With Police Protection In Mind", Brochure for Eyewitness (Date Unknown).
Movie "Blue Thunder", Columbia Pictures, Indus, Ltd. (Copyright 1982).
"Flight Testing—The Continuing Challenge", Paper from Society of Flight Test Engineers 17$^{th}$ Annual Symposium Proceedings, p. 6.4–1 to 6.45 (Aug. 10–14, 1986).
"MTSI Catalog" (1993).
"EYEWITNESS Reference Manual—Owners Manual", Kustom Signals, Inc. (Copyright 1993).
"Crimtec Installation Manual", Crimtec, Loivonia, MI 48150, (Not dated).
"Crimtec Instruction Manual", Crimtec, Loivonia, MI 48150, (Not dated).
Motorists in Des Peres to be captured on Police 'Candid Camera', St. Louis Globe–Democrat (Jan. 11, 1984; vol. 132–vol. 132–No. 167).
Brochure on "Eyewitness Systems", The Toman Group (VMI), St. Louis, Mo., (not dated).
Specification for the EYEWITNESS System of the Toman Group.
Drawings for the Eyewitness System of the Toman Group (Jul., 1983).

* cited by examiner

FIG. 3
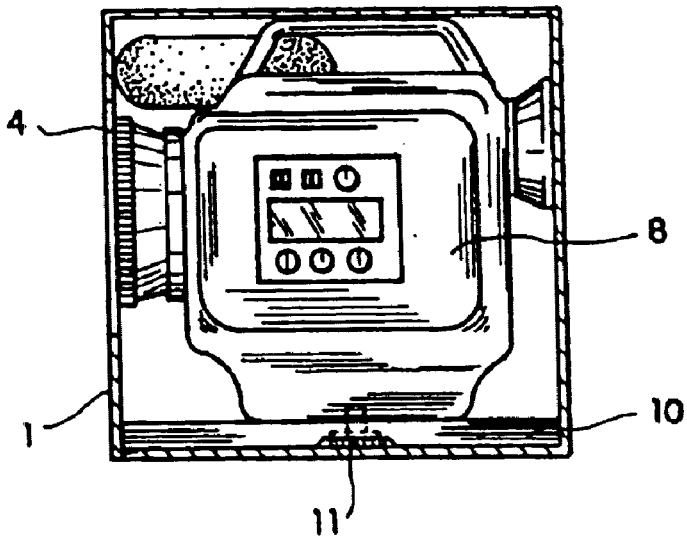
FIG. 4
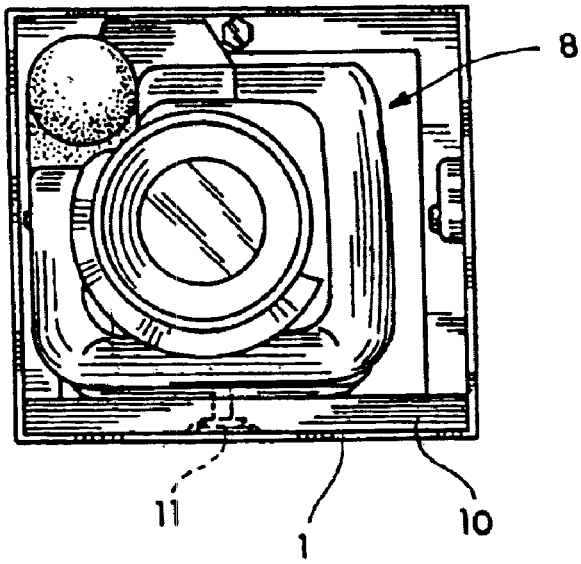
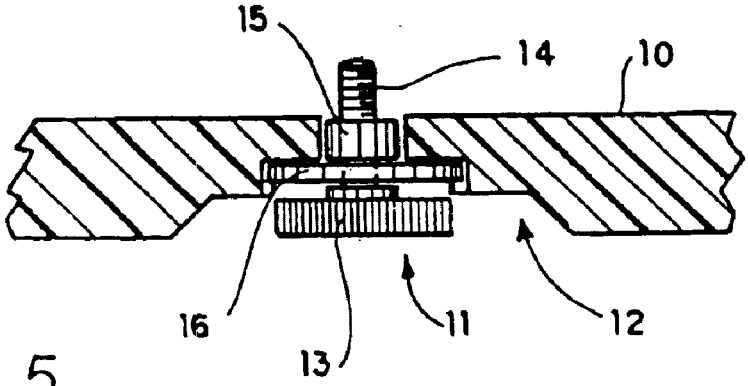
FIG. 5

VIDEO MONITOR AND HOUSING ASSEMBLY

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the use of camera monitors for surveillance. More particularly, it relates to the use of video cassette recorders (VCRs) or camcorders to record activity by a user when the user is absent from the location to be monitored. The user may monitor the activity which occurred during his/her absence by playing back the cassette at a later time.

2. Description of the Prior Art

In public places where people gather it is often desirable to place monitoring devices so as to detect and in some cases record any improper activity which may occur. For example, some banks use cameras to record and monitor the lobby in the event of a robbery. Likewise, some industrial plants use cameras placed in employee parking lots or employee break rooms to detect improper activities such as thefts or fights.

U.S. Pat. No. 4,855,823 issued Aug. 8, 1989 to Kenneth E. Struhs et al discloses a monitoring system remotely and robotically controlling the camera including the control of the lens system, the direction of the camera's field of view, and the mounting of the camera.

U.S. Pat. No. 3,175,037 issued Mar. 23, 1965 to Howard R. Padgitt discloses a television lens system with a wide viewing angle.

U.S. Pat. No. 4,899,231 issued Feb. 6, 1990 to Massaya Maeda et al discloses a video recorder system of reduced size and weight.

U.S. Pat. No. 4,978,984 issued Dec. 18, 1990 to Richard A. Brookfield discloses a surveillance apparatus installed in the air vent of a motor vehicle.

None of the above disclosures teach the use of a box mounted in a vehicle which can be opened to place a VCR/camcorder therein when the passenger compartment is to be monitored. After the monitoring is completed, the monitoring device can be easily removed as disclosed by the present invention. This feature is not demonstrated in the prior art.

SUMMARY OF THE INVENTION

Accordingly one object of the present invention is to provide a box within the passenger compartment of a vehicle so that a VCR/camcorder may be placed therein when monitoring of the activity in the vehicle is desired and removed any other time.

Another object of the present invention is to provide a solar cool glass window on the door of the box so as to allow monitoring of the compartment by the VCR/camcorder when the door of the box is closed while not allowing anyone to see into the box. The solar cool glass will further reduce any glare the VCR/camcorder may pick up while recording, for example, from the sun shining through the windows of the compartment.

Still another object of the present invention is to provide mounting means for the VCR/camera to prevent movement of the camera within the box as monitoring of the compartment is taking place.

The present invention provides for a box mounted within the passenger compartment of a vehicle to house a VCR/camcorder. The video camera is turned on to record the activities transpiring within the vehicle as the vehicle is in operation. During this time the door of the box is closed and locked to prevent anyone from tampering with the video camera. The recorded information is later reviewed to detect any improper behavior by the driver of the vehicle or the passengers.

BRIEF DESCRIPTION OF THE DRAWINGS

FIG. 3 is a side elevation view of the mounting base and camera with the box shown in section.

FIG. 4 is a front elevation view of the box with the door omitted to show a snug fit of the mounting base along the sides and bottom of the box.

FIG. 5 is a cross-section view of the camera mounting screw in the recessed portion of the bottom of the mounting base.

DETAILED DESCRIPTION OF THE PREFERRED EMBODIMENTS

Figure 1:
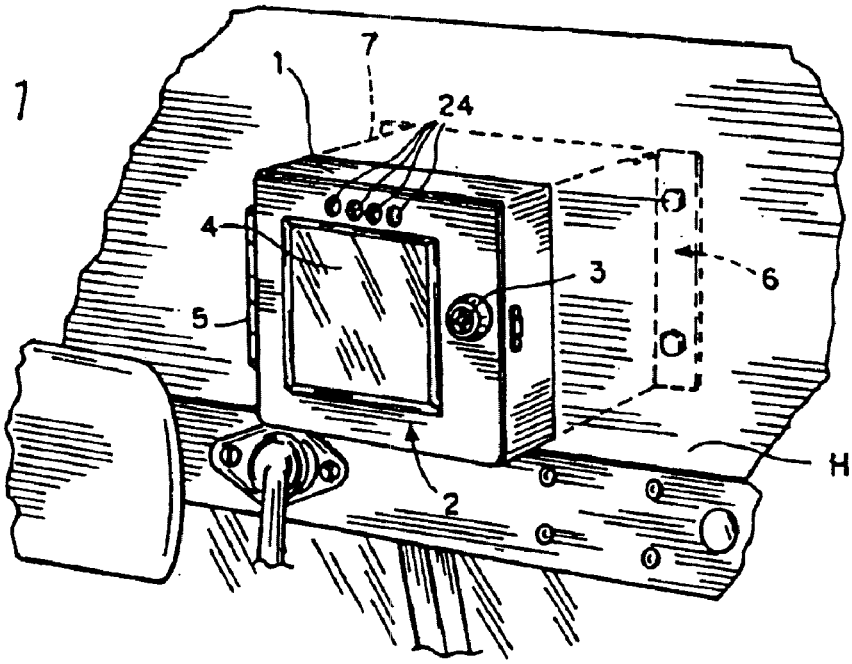
FIG. 1 is a perspective view of the box of the present invention mounted inside a bus above the driver.

FIG. 1 shows the box 1 of the present invention as it is intended to be used. The box 1 is mounted on the inside of a school bus, for example, using mounting angles 6 and 7 which may be attached to the box 1 in any conventional manner, such as by spot welding. The other faces of the mounting angles 6 and 7 are held to the wall of the bus through the use of screws or bolts 26, for example, as shown in FIG. 1. By such an arrangement the box 1 is securely and rigidly attached to the wall of the bus. While in the preferred embodiment a school bus is shown to be the vehicle in which the box 1 is mounted, box 1 may be mounted in any conventional vehicle. As further shown in FIG. 1, preferably the box 1 is mounted substantially within the header H of the bus, as indicated by dash lines, with only a small, forward portion of the box 1 (e.g., an inch or two) being exposed through the bus header H. The idea is for security purposes and to render the monitor as unobtrusive as possible.

Figure 6:
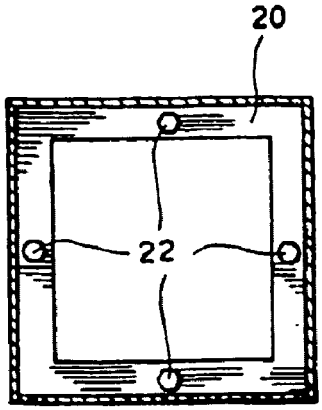
FIG. 6 is a cross-section view of the back of the camera mounting box according to a preferred embodiment of the invention.

With reference to FIG. 6, a preferred embodiment of the structure of the back of the box 1 is illustrated. A four sided mounting flange 20 is formed at the back of box 1 or may be formed separately and spot welded to the rear of the box 1. Bolts 22 or spot welding (not shown) may be used to firmly secure the box 1 to the wall of the bus. This mounting structure provides a blind mounting for box 1 for further security, so that a thief or vandal cannot access the bolts 22 to remove the invention.

Figure 2:
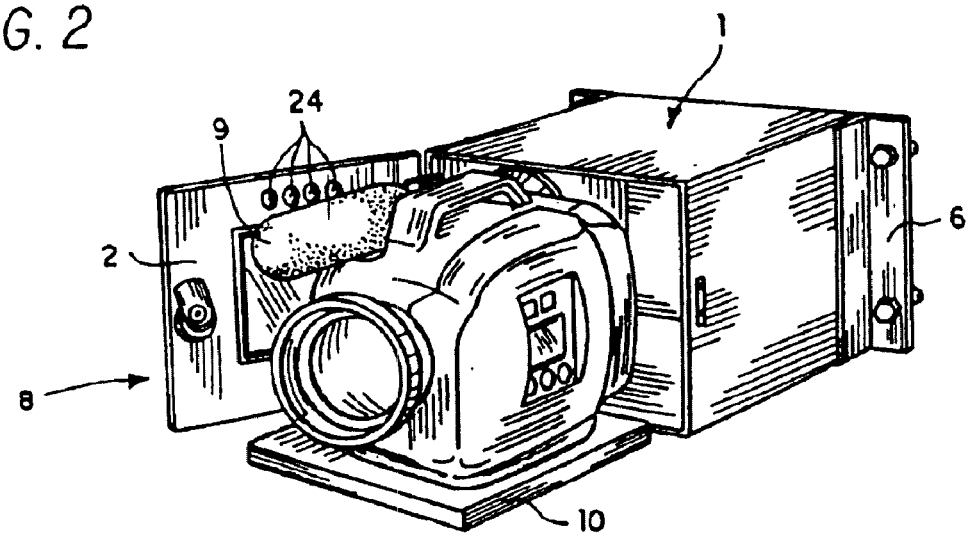
FIG. 2 is a perspective view of the box with the door open to show how the mounting base with camera is placed into and removed from the box.

Other features of the box 1 in accordance with the preferred embodiment include an open end of the box 1 in front of which a door 2 is placed so as to swing along the open end of the box 1 using door hinge 5. Door 2 can be locked shut using keylock 3. When opened, VCR/camera 8 can be removed from or placed into the box 1 easily. Before placing the VCR/camera 8 into box 1, the VCR/camera 8 is first turned on to record. As shown in FIG. 2, VCR/camera 8 is any conventional commercially available video camera such as a minicam using 8 mm cassette cartridges and operating off rechargeable batteries. Preferably, the minicam is a palmcorder, which fits neatly within the confines of a 6" by 6" by 6" box. Several such video cameras are commercially available and include, by way of example, the Panasonic PV-10 and the General Electric CG-690. Such devices are compact and portable. They generally have a microphone 9 as well as a handle and front lens. They also have a pod mounting nut at the bottom of the VCR/camera so as to be attached to and rigidly supported by a tripod.

As shown in FIG. 3, this pod mounting nut is used in the present invention to mount VCR/camera 8 to a mounting base 10. Screw 11 at the bottom of mounting base 10 is used to mount VCR/camera 8 rigidly to mounting base 10 via the pod mounting nut of VCR/camera 8. Mounting base 10 fits snugly into the box 1 and rests at the bottom side of the box 1 (see FIG. 4). Such an arrangement allows for the easy placement of VCR/camera 8 into box 1 and easy removal therefrom. Once VCR/camera 8 is attached to mounting base 10 and set to record, this arrangement is placed into the box 1. A window 4 allows the VCR/camera 8 to view the passenger compartment of the bus when door 1 is closed and a series of through bores or holes 24 positioned above window 4 permit sound to pass through the door 2 and to be picked up by the recorder microphone 9 which is located immediately behind door 2 when it is closed.

As shown in FIG. 4, the dimensions of mounting base 10 are such that the base 10 fits snugly into box 1 so that the base 10 does not move relative to the box 1 when the door 2 is closed and locked. In one embodiment, the dimensions of the box 1 is twelve inches long by six inches high by six inches wide. The length of both the box 1 and base 10 will be dictated by the size of the VCR/camera 8, generally speaking, and can be as short as six inches when a company minicam is used. In any event, the length and width of mounting base 10 are substantially the same as the dimensions of the box 1. Since the walls of the box 1 are thin, the length and width of mounting base 10 are slightly less the six inches. Mounting base 10 is preferably made of plexiglass, but may be made of any suitable material. The thickness of mounting base 10 is preferably a half of an inch, for example.

FIG. 5 shows the camera mounting screw 11 at the bottom of mounting base 10. Screw 11 is located in a recessed portion 12 so that the screw 11 does not touch the bottom side of box 1 as it is being placed into or removed from box 1. The recessed portion 12 is large enough to allow the user of the device to manually manipulate the screw 11 by turning thumbwheel 13. Screw thread 14 of screw 11 is the same as those used in the conventional tripod arrangement. Screw thread 14 is standard quarter inch thread and matches the threading of the pod mounting nut. Screw 11 is securely mounted to the base 10 so as not to fall out when VCR camera 8 is not attached to the base 10. This is done through the use of a keeper ring 16 which is rigidly and securely attached to mounting base 10. Ring 16 has a hole in its center large enough so as to allow the reduced diameter middle portion of screw 11 to fit inside the hole. However, the hold is too small to allow either screw flange 15 or thumbwheel 13 to pass through it. Thus, the screw 11 is rotatably but securely mounted into the ring 16.

Although the invention has been described in detail as to the best mode of carrying out the invention, certain modifications can be made without departing from the spirit of the invention. For example, box 1 was described as being screwed into the wall of the bus so as to be rigidly and securely mounted thereto. With this arrangement the box 1 will not move relative to the passenger compartment, thus assuring steady recording by VCR camera 8. Also the theft of the box 1 is deterred. However, the box 1 could be welded to the wall of the bus to further deter the theft of the box 1. The method of securing the box 1 to the wall is a matter of choice.

It is to be understood that the present invention is not limited to the embodiments described above, but encompasses any and all embodiments within the scope of the following claims.

We claim:

[1. A monitoring installation for a vehicle to enable monitoring of activity within the vehicle, comprising:

an outer vehicle wall;

an inner vehicle wall spaced from and parallel to said outer vehicle wall;

an opening provided in said inner vehicle wall;

a box having an open end and flange means on a side opposite said open end;

said box being inserted through said opening to abut said flange means against an inner surface of said outer wall, said opening facing within the vehicle;

means affixing said flange means and said box to said outer vehicle wall;

a door mounted upon said box;

hinge means attached to said door and said box to enable said door to be displaced to and from a position overlying said open end of said box;

latch means for holding said door in said position overlying said open end of said box;

recording monitoring means located within said box comprising;

a base member configured to closely fit within said box; a video tape camera; and means connecting said video tape camera to said base member comprising;

a threaded mounting member on said video tape camera; and a threaded element held on said base member by a keeper ring; whereby engagement between said threaded mounting member and said threaded element prevents relative movement between said video tape camera, said base member and said box; whereby said base member prevents said recording monitoring means from moving relative to the box when said door is in a position overlying said open end of said box; and monitor enabling means on said door enabling said recording monitoring means to monitor activity within the vehicle through and unimpeded by said door when displaced to a closed position overlying said open end of said box; whereby unauthorized access to said recording monitoring means is thwarted when said door is displaced to a position overlying said open end of said box.]

[2. A monitoring installation as in claim 1, said flange means extending interiorly of said box, and said affixing means includes means for securing said interiorly extending flange means to said outer vehicle wall.]

[3. A monitoring installation as in claim 1, said latch means comprising a key operated lock.]

[4. A monitoring installation as in claim 1, said monitor enabling means includes optical means enabling the passage of light waves therethrough.]

[5. A monitoring installation as in claim 4, said optical means comprises a solar cool glass window provided on said door.]

[6. A monitoring installation as in claim 1, wherein said vehicle is a school bus.]

[7. A monitoring installation as in claim 1, wherein said monitor enabling means includes openings through said door allowing for the passage of sound therethrough.]

*8. A video recorder housing assembly which may contain a recording device to enable recording of activities within a bus having a header section defined by at least two parallel walls spaced apart from each other, comprising:*

*a) a box having an open end, two sides projecting generally perpendicular to the plane of said open end, and a bottom generally perpendicular to the plane of said open end and connecting said sides;*

*b) means for affixing said box within the header;*

*c) a door hingedly mounted to said box to enable said door to be displaced to and from a position overlying said open end of said box, said door having optical means for passage of light therethrough; and*

*d) means to prevent movement of a recording device within said box.*

*9. A recording enablement device according to claim 8, wherein at least one wall in the header is provided with an opening through which a portion of said open end of said box extends outside the header.*

*10. A video recorder housing assembly according to claim 8, wherein said means to prevent movement of a recording device within said box comprises a threaded mounting member on the recording device, a base member and a threaded element on said base member for threadedly engaging said mounting member of the recording device.*

*11. A recording enablement device according to claim 8, further comprising:*

*e) latch means fixed to said door for securely fastening said door in a position overlying said open end of said box.*

*12. A recording enablement device according to claim 8, wherein said optical means is of a material which prevents bus occupants from seeing the contents of said box.*

*13. A recording enablement device according to claim 12, wherein said optical means of said door includes a solar cool glass window.*

*14. A recording enablement device according to claim 8, wherein said door is provided with holes for passage of sound therethrough.*

*15. A video recorder housing assembly which may contain a recording device to enable recording of activities within a bus having a header section defined by at least two parallel walls spaced apart from each other and a ceiling connecting the walls of the header, comprising:*

*a) a box having an open end, two sides projecting generally perpendicular to the plane of said open end, and a bottom generally perpendicular to the plane of said open end and connecting said sides;*

*b) means for affixing said box to the ceiling;*

*c) a door hingedly mounted to said box to enable said door to be displaced to and from a position overlying said open end of said box, said door having optical means for passage of light therethrough; and*

*d) means to prevent movement of a recording device within said box.*

*16. A recording enablement device according to claim 15, wherein at least one wall in the header is provided with an opening through which a portion of said open end of said box extends outside the header.*

*17. A video recorder housing assembly according to claim 15, wherein said means to prevent movement of a recording device within said box comprises a threaded mounting member on the recording device, a base member and a threaded element on said base member for threadedly engaging said mounting member of the recording device.*

*18. A recording enablement device according to claim 15, further comprising:*

*e) a latch means fixed to said door for securely fastening said door in a position overlying said open end of said box.*

*19. A recording enablement device according to claim 15, wherein said optical means is of a material which prevents bus occupants from seeing the contents of said box.*

*20. A recording enablement device according to claim 19, wherein said optical means of said door includes a solar cool glass window.*

*21. A recording enablement device according to claim 15, wherein said door is provided with holes for the passage of sound therethrough.*

*22. A video recorder housing assembly which may contain a recording device to enable recording of activities within a bus having a header section defined by at least two parallel walls spaced apart from each other and a floor connecting the walls of the header, comprising:*

*a) a box having an open end, two sides projecting generally perpendicular to the plane of said open end, and a bottom generally perpendicular to the plane of said open end and connecting said sides;*

*b) means for affixing said box to the floor in the header;*

*c) a door hingedly mounted to said box to enable said door to be displaced to and from a position overlying said open end of said box, said door having optical means for passage of light therethrough; and*

*d) means to prevent movement of a recording device within said box.*

*23. A recording enablement device according to claim 22, wherein at least one wall in the header is provided with an opening through which a portion of said open end of said box extends outside the header.*

*24. A video recorder housing assembly according to claim 22, wherein said means to prevent movement of a recording device within said box comprises a threaded mounting member on the recording device, a base member and a threaded element on said base member for threadedly engaging said mounting member of the recording device.*

*25. A recording enablement device according to claim 22, further comprising:*

*e) a latch means connected to said door for securely fastening said door in a position overlying said open end of the box.*

*26. A recording enablement device according to claim 22, wherein said optical means is of a material which prevents bus occupants from seeing the contents of said box.*

*27. A recording enablement device according to claim 26, wherein said optical means of said door includes a solar cool glass window.*

*28. A recording enablement device according to claim 22, wherein said door is provided with holes for the passage of sound therethrough.*

*29. A video recorder housing assembly which may contain a recording device to enable recording of activities within a bus having a header section defined by at least two parallel walls spaced apart from each other, comprising:*

*a) a box having an open end, two sides projecting generally perpendicular to the plane of said open end,*

*and a bottom generally perpendicular to the plane of said open end and connecting said sides;*

*b) means for affixing said box adjacent to the header with said open end opposed to said header;*

*c) a door hingedly mounted to said box to enable said door to be displaced to and from a position overlying said open end of said box, said door having optical means for passage of light therethrough; and*

*d) means to prevent movement of a recording device within said box.*

*30. A recording enablement device according to claim 29, wherein at least one wall in the header is provided with an opening through which a portion of said open end of said box extends outside the header.*

*31. A video recorder housing assembly according to claim 29, wherein said means to prevent movement of a recording device within said box comprises a threaded mounting member on the recording device, a base member and a threaded element on said base member for threadedly engaging said mounting member of the recording device.*

*32. A recording enablement device according to claim 29, further comprising:*

*e) a latch means connected to said door for securely fastening said door in a position overlying said open end of the box.*

*33. A recording enablement device according to claim 29, wherein said optical means is of a material which prevents bus occupants from seeing the contents of said box.*

*34. A recording enablement device according to claim 33, wherein said optical means of said door includes a solar cool glass window.*

*35. A recording enablement device according to claim 29, wherein said door is provided with holes for the passage of sound therethrough.*

*36. A video recorder housing assembly which may contain a recording device to enable recording of activities within the passenger compartment of a bus, comprising:*

*a) a box having an open end, two sides projecting generally perpendicular to the plane of said open end, and a bottom generally perpendicular to the plane of said open end and connecting said sides;*

*b) means for mounting said box within the passenger compartment of a bus;*

*c) a door hingedly mounted to said box to enable said door to be displaced to and from a position overlying said open end of said box, said door having optical means for passage of light therethrough; and*

*d) means for preventing movement of said recording device relative to said box.*

*37. A video recorder housing assembly according to claim 36, wherein said means for mounting a recording device within said box comprises a threaded mounting member on the recording device, a base member and a threaded element on said base member for threadedly engaging said mounting member of the recording device.*

*38. A recording enablement device according to claim 36, further comprising:*

*e) a latch means fixed to said door for securely fastening said door in a position overlying said open end of said box.*

*39. A recording enablement device according to claim 36, wherein said optical means is of a material which prevents bus occupants from seeing the contents of said box.*

*40. A recording enablement device according to claim 39, wherein said optical means of said door includes a solar cool glass window.*

*41. A recording enablement device according to claim 36, wherein said door is provided with holes for the passage of sound therethrough.*

* * * * *